April 30, 1968     G. M. JELLEN     3,380,751

SLED

Filed April 13, 1966

INVENTOR.
GEORGE MARCUS JELLEN

United States Patent Office 3,380,751
Patented Apr. 30, 1968

3,380,751
SLED
George Marcus Jellen, 117 Santa Maria,
San Bruno, Calif. 94066
Filed Apr. 13, 1966, Ser. No. 542,291
1 Claim. (Cl. 280—25)

ABSTRACT OF THE DISCLOSURE

A sled having special runners and suspension therefor wherein the runners remain flat in contact with the ground at all times, thus providing enhanced steering and stability and a smoother more controlled ride.

Summary of the invention

My sled has a horizontal bed with first and second spaced apart horizontal arms extending transversely across the bottom surface of the bed and disposed adjacent the front and rear ends respectively of the bed.

It further employs four leaf springs lying in vertical planes and secured to corresponding ends of the corresponding arms, and four coplanar horizontal runners extending below the bed transversely of the arms, each runner being secured to a corresponding end of the corresponding arm. The first arm is pivotally secured at its midpoint to the bed whereby a user can steer the sled by turning the springs secured to the first arm.

Brief description of the drawings

In the drawings.

Referring now to FIGS. 1, 2, 3, 4 and 5 there is shown a flat, generally rectangular, horizontal elongated sled bed 10.

Figure 1:
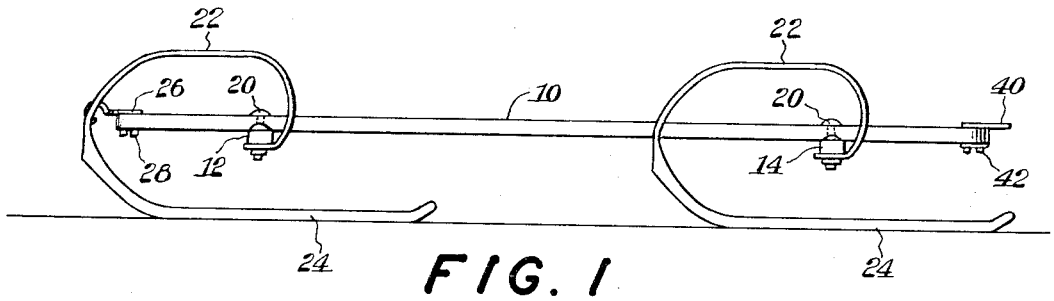
FIG. 1 is a side view of one embodiment of my sled.
Figure 2:
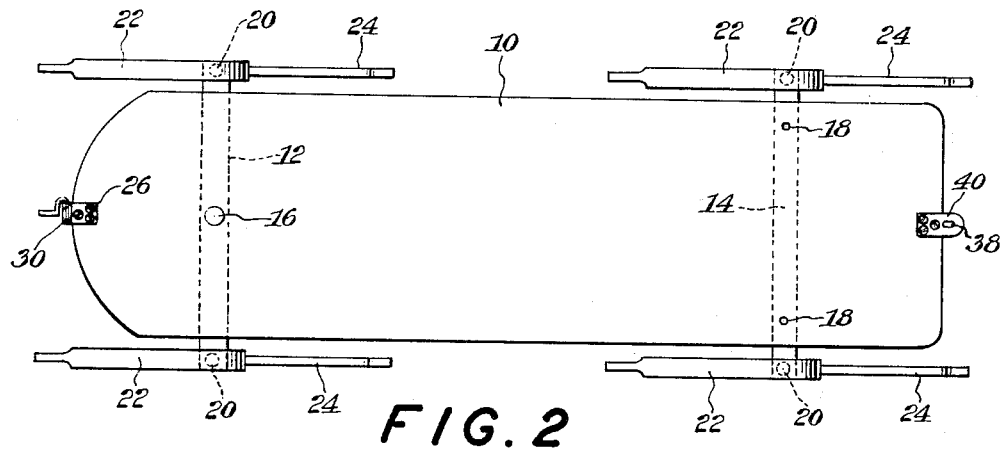
FIG. 2 is a top plan view thereof.
Figure 3:
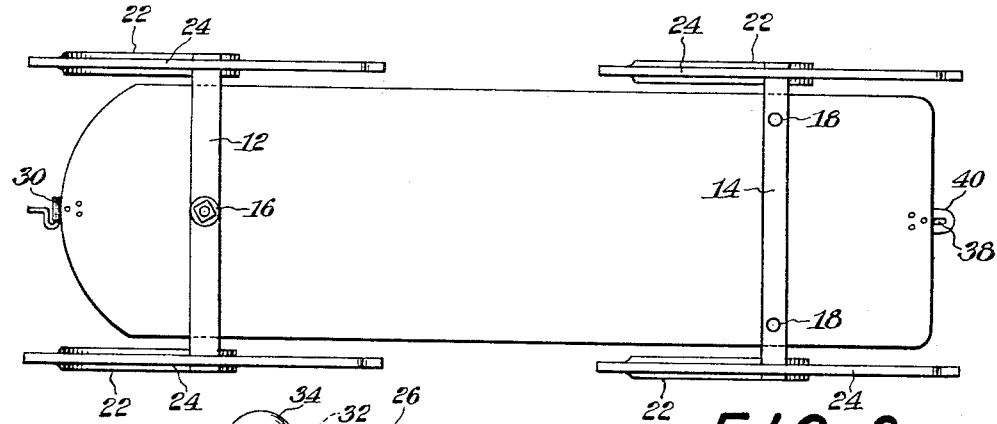
FIG. 3 is a bottom plan view therof.
Figure 4:
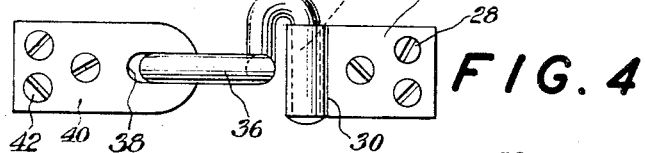
FIG. 4 is a top view of a sled coupler used on my sled.
Figure 5:
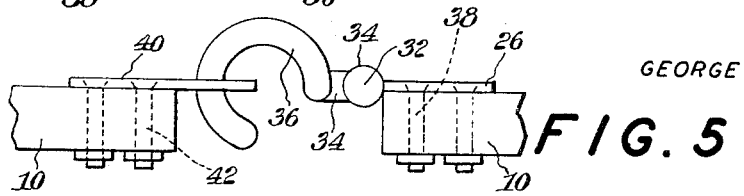
FIG. 5 is a side view of the coupler of FIG. 4.

First and second spaced apart horizontal arms 12 and 14 extend across the bottom of the bed in a direction perpendicular to direction of elongation of the bed, arm 12 being bolted at its midpoint along the center line of elongation of the sled adjacent the front thereof, as shown at 16, arm 14 being bolted adjacent opposite ends thereof and adjacent the sides of the bed in the region of the rear thereof as shown at 18.

Additional bolts 20 at each end of arm 12 secure one end of a corresponding one of leaf springs 22 to the underside of arm 12 whereby a separate spring 22 is positioned adjacent each side of the bed adjacent the front and lying in a vertical plane. The other end of each spring 22 terminates in a lower horizontal runner 24 extending rearward in the direction of elongation.

Similarly additional bolts 20 at each end of arm 14 secure one end of a corresponding one of leaf spring 22 to the underside of arm 14 whereby a separate spring 22 lying in a vertical plane is positioned adjacent each side of the bed adjacent the rear. As before the other end of each spring 22 terminates in a lower horizontal runner 24 extending rearward in the direction of elongation. All runners 24 are coplanar.

Secured to the top surface of bed 10 at the midpoint of the front edge is a flat metal plate 26 bolted to bed 10 at 28 and having an outwardly projecting horizontal bore 30 extending transversely to the direction of elongation of the bed. A horizontal rod 32 is rotatably mounted in bore 30, one end of rod 32 being connected by a horizontal loop 34 to one end of a downwardly extending vertical hook 36 adapted to engage a slot 38 in a horizontal plate 40 bolted at 42 to the top of the rear edge of the bed of a lead sled.

Similarly, the midpoint of the rear edge of the bed supports an overlying plate 40 bolted at 42 thereto and adapted to receive the hook 36 at the front edge of a trailing sled.

Since arm 14 is rigidly bolted to the bed, the rear runners are fixed in position. However, since arm 12 is secured to bed 10 only by the central bolt, the sled user by grasping the top of the forward leaf springs can rotate the arm 12 around the central bolt in a horizontal plane to steer the sled.

The sled coupling arrangement described above provides a secure connection with sufficient play to permit the various connected sleds to traverse uneven ground without causing accidental disconnection.

While I have described my invention with particular reference to the drawings, my protection is to be limited only by the terms of the claim which follow.

Having thus described my invention, I claim as new and desire to secure by Letters Patent:

1. A sled comprising a horizontal, elongated, flat and generally rectangular bed having front and rear edges, first and second horizontal arms secured to the underside of the bed and extending transversely to the direction of elongation of the bed, the first and second arms being positioned adjacent corresponding front and rear edges of said bed, first, second, third and fourth leaf springs lying in vertical planes, one end of each of the first and second springs being secured to the underside of the first arm at corresponding ends thereof, one end of each of the third and fourth springs being secured to the underside of the second arm at corresponding ends thereof, and first, second, third and fourth coplanar horizontal runners extending below said bed rearward along said direction of elongation, each runner being secured to the other end of the corresponding spring, said second arm being rigidly secured to said bed, said first arm being pivotally secured at its midpoint to said bed to permit the sled user, by grasping the top of the first and second springs, to rotate the first arm about the pivot point to steer the sled, said first arm extending beyond the side edge of the bed and so positioned forwardly on the bed as to prevent contact between the bed and said first and second springs during steering, said first and second springs having top portions extending above said bed.

References Cited

UNITED STATES PATENTS

| 293,152 | 2/1884 | Detamble | 280—15 |
| 432,721 | 7/1890 | Berry | 280—28 |
| 1,770,291 | 7/1930 | Adkins | 280—515 |
| 2,095,951 | 10/1937 | Andrus | 280—28 |
| 2,278,244 | 3/1942 | Smithwick | 280—60 |

BENJAMIN HERSH, Primary Examiner.

J. SIEGEL, Assistant Examiner.